United States Patent [19]

Ice

[11] Patent Number: 4,588,252
[45] Date of Patent: May 13, 1986

[54] ELECTRODE EXTENSION HOLDERS

[76] Inventor: Roger L. Ice, R.D. #2, Box 121F, Smithfield, Pa. 15478

[21] Appl. No.: 221,531

[22] Filed: Dec. 31, 1980

[51] Int. Cl.$^4$ .............................................. H01R 7/06
[52] U.S. Cl. ............................................... 339/268 R
[58] Field of Search ........ 339/103 C, 118 R, 118 RY, 339/263 R, 263 E, 268 R, 268 S

[56] References Cited

U.S. PATENT DOCUMENTS

| | | |
|---|---|---|
| 1,933,942 | 11/1933 | Tiedemann . |
| 2,034,259 | 3/1936 | Hopkins . |
| 2,039,167 | 4/1936 | Hopkins . |
| 2,232,963 | 2/1941 | Papp ................................ 339/268 S |
| 2,360,016 | 10/1944 | Roland . |
| 2,383,951 | 9/1945 | Bass . |
| 2,463,145 | 3/1949 | Buchanan .................... 339/268 S X |
| 2,731,618 | 1/1956 | Aberle ............................ 339/268 S |
| 3,034,082 | 5/1962 | Rayon ........................ 339/118 R Y |
| 3,041,575 | 6/1962 | Schneider .................. 339/268 R X |
| 3,219,793 | 11/1965 | Mahoney . |
| 3,596,052 | 7/1971 | Smith . |
| 3,810,078 | 5/1974 | Chordas .......................... 339/268 R |
| 3,818,422 | 6/1974 | Pertuit ........................ 339/268 S X |

FOREIGN PATENT DOCUMENTS 304007 1/1929 United Kingdom ............ 339/268 S
622571 5/1949 United Kingdom ............ 339/268 S Primary Examiner—Fred Silverberg

[57] ABSTRACT

An electrode extension connector for connecting two coated welding rods together in end to end conductive relationship is provided in the form of a housing of generally cylindrical cross section and of electrical and heat insulative material, a block of electrically conductive material intermediate the ends of said housing adapted to abut the end of an electrode inserted in each end of said housing and chuck means in each end of said housing for detachably engaging and gripping a welding electrode end in contact with said block of electrically conductive metal.

9 Claims, 7 Drawing Figures

ELECTRODE EXTENSION HOLDERS

This invention relates to electrode extension holders and particularly to out of position welding rod extension holders which will permit a coated welding rod to be extended several times its length from the electrode holder either in a straight line or at an angle.

In the art of electric welding there are many situations where welding would be much more easily accomplished if means were available for readily attaching two or more welding electrodes or rods in end to end relationship either in a straight line or in angular relationship where access to the weld area is remote from the weld. This is particularly true in many repair situations where a break internally of a structure must be repaired without dismembering the structure. There are many such situations in the practice of welding and no really satisfactory means for accomplishing this has been available. Welders have attempted to solve this problem by various expedients such as welding the ends of several electrodes together and by other "jerry-rigged" arrangements. Some of the more sophisticated attempts to solve this problem and related problems of electrode extension are illustrated in U.S. Pat. Nos. 2,034,259 to Hopkins, 2,039,167 to Hopkins and 3,219,793 to Mahoney. Both of the Hopkins' patents require special fittings and special machining of the electrodes. The Mahoney patent is dependent upon a plurality of end to end extensions which are threadingly engaged, one of which carries a chuck to engage the exposed end of a weld rod.

Welding rods for arc rod welding are generally coated with a coating containing flux forming and other materials, with a short uncoated end for engagement by the electrode holder. The present invention provides a connector which both mechanically and electrically connects this uncoated end of one weld rod with the end of an adjacent weld rod from which a portion of the coating has been removed.

This invention provides an electrode extension connector for connecting two or more coated welding rods together in end to end relationship comprising a generally cylindrical housing of electrical and heat insulative material, a block of electrically conductive metal intermediate the ends of said housing adapted to abut the end of an electrode and chuck means in each end of the housing for detachably engaging or gripping a welding electrode in contact with said block of electrically conductive metal. Preferably, the block of electrically conductive metal is copper. The housing may be any electrical and thermally insulative solid material such as "Bakelite" or similar phenol formaldehyde resins, phenolic resins and the like alone or fiber filled. The chuck is preferably made of an electrical and heat insulative material such as a resin but may be made of metal or partially of metal. The housing may be a straight cylinder or it may be formed as an angular member.

In the foregoing general description of this invention I have set out certain objects, purposes and advantages of this invention. Other objects, purposes and advantages of the invention will be apparent from a consideration of the following description and the accompanying drawings in which.

Figure 1:
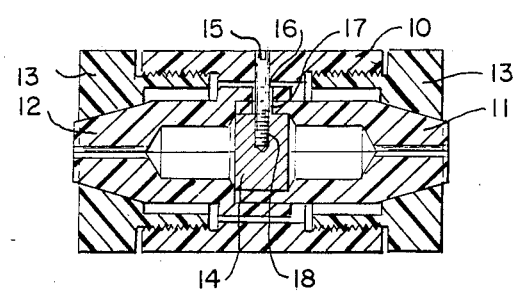
FIG. 1 is a section through a straight line electrode extender according to this invention.
Figure 2:
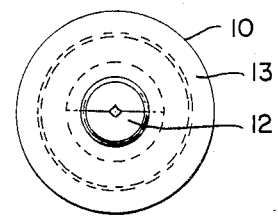
FIG. 2 is an end elevation of the electrode extender of FIG. 1.
Figure 3:
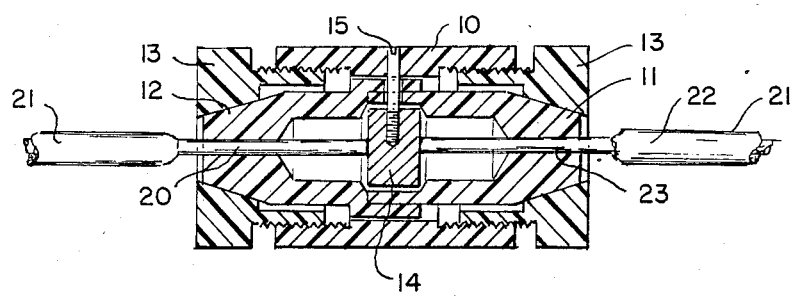
FIG. 3 is a section through the extender of FIG. 1 showing electrode in place.

Referring to the drawings I have illustrated in FIG. 1 an electrode extension holder for straight line extension of a welding electrode which is made up of a cylindrical housing 10 of an electrically and heat insulative fiber filled resin, a pair of chuck jaws 11 and 12 in either end of housing 10 surrounded by an adjusting chuck collets 13 threadingly engaging the outer periphery of each set of chuck jaws 11 and 12 and a central block of copper 14 intermediate chuck jaws 11 and 12 which is held in place by a keeper screw 15 which passes through holes 16 and 17 in jaws 11 and 12 respectively into a threaded opening 18 in the copper block.

In use, the uncoated end 20 of a conventional coated welding electrode 21 is inserted in between jaws 12 until the end 20 engages copper block 14 and collet 13 is tightened to close jaws 12 around the end 20 to hold it in place. The coating 22 is removed from the tip 23 of a second welding electrode 21 and the tip end of the second electrode is inserted between jaws 11 until the exposed tip 23 contacts copper block 14 whereupon collet 13 around jaws 11 is tightened to close jaws 11 about the second welding electrode 21. The uncoated end of this second electrode is inserted in the electrode holder to provide a double length electrode. The electrode could be extended multiple times by using additional electrode extension members.

Figure 4:
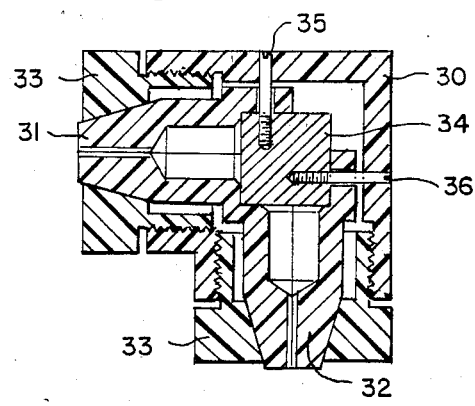
FIG. 4 is a section through a right angle electrode extender according to this invention.

The embodiment illustrated in FIG. 4 is designed to provide a 90° extension of an electrode. It is made up of housing 30 of electrical and thermal insulative material of cylindrical section in a 90° form. The two ends have jaws 31 and 32 surrounded by tightening collets 33 and connected by an intermediate block 34 of copper held in place by keeper screws 35 and 36 which pass through openings in housing 30 and jaws 31 and 32 to fix the jaws in place.

Figure 5:
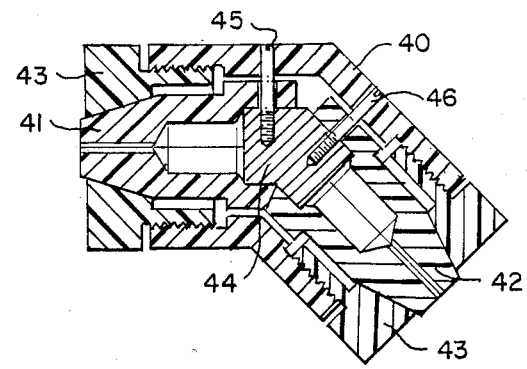
FIG. 5 is a section through a 45° electrode extender according to this ivention.

The embodiment illustrated in FIG. 5 provides a 45° extension of an electrode. It is made up of a housing 40 of electrical and thermal insulative material of cylindrical section in a 45° form. The two ends carry jaws 41 and 42 surrounded by tightening collets 43 and connected by an intermediate copper block 44 held in place by keeper screws 45 and 46.

The embodiments of FIGS. 4 and 5 are used precisely as the embodiment of FIG. 1.

Figure 6:
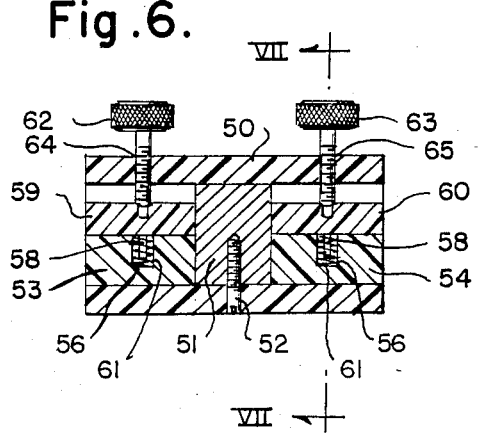
FIG. 6 is a section through a second embodiment of straight line electrode extender according to this invention.
Figure 7:
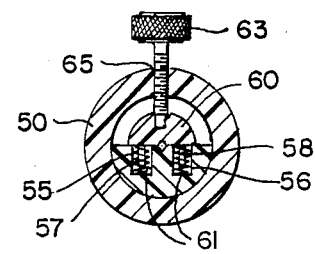
FIG. 7 is a section on the line VII—VII of FIG. 6.

In FIGS. 6 and 7 I have illustrated a second embodiment of chuck structure in a straight line extension electrode holder. In this embodiment I provide a cylindrical housing 50 of thermal and electrical insulative material having an intermediate block of copper 51 held in place by keeper screw 52. Anvil members 53 and 54 are fixed in each end of housing 50. Each of the anvil members 53 and 54 is provided with a pair of spaced openings 55 and 56 receiving guide members 57 and 58 on half cylindrical hold down members 59 and 60 and recoil springs 61 which surround guide members 57 and 58 urging the hold down members 59 and 60 away from anvil members 53 and 54. Adjusting screws 62 and 63 are threaded in openings 64 and 65 in housing 50 above and intermediate the ends of and bearing on anvil members 53 and 54 respectively.

In use the screws 62 and 63 are turned to permit the hold down members 59 and 60 to move away from anvil members 53 and 54 so that the ends of the two electrodes can be inserted between the hold down members and the anvil members to contact the copper block 51 generally as described above in connection with FIG. 1. The screws 62 and 63 are then turned the opposite direction to tightly engage the electrode ends between the anvil members and the hold down members.

In the foregoing specification I have set out certain preferred practices and embodiments of my invention, however, it will be understood that this invention may be otherwise embodied within the scope of the following claims.

I claim:

1. An electrode extension connector for connecting two flux coated welding rods together in end to end relationship comprising a housing of generally cylindrical cross section and of electrical and heat insulative material, a block of electrically conductive material intermediate the ends of said housing adapted to abut the end of an electrode inserted in each end of said housing and a thermally and electrically insulative chuck means in each end of said housing for selectively detachably and removably engaging and gripping an uncoated welding electrode end in contact with said block of electrically conductive metal.

2. An electrode extension connector as claimed in claim 1 wherein the chuck means includes a pair of jaws having tapered frusto-conical ends and a collet threaded thereon having a corresponding frusto-conical inner surface bearing on the jaws to close them together when the collet is tightened onto the jaws.

3. An electrode extension connector as claimed in claim 1 wherein the chuck means is an anvil fixed in each end of said housing, a hold down member movable above said anvil, guide means between said anvil and hold down member and means moving said hold down member toward and away from said anvil.

4. An electrode extension connector as claimed in claim 3 wherein the means for moving the hold down member toward and away from the anvil includes a screw member threaded in the housing end and bearing on the hold down member and resilient means between said hold down member and anvil.

5. An electrode extension connector as claimed in claim 1 or 2 or 3 or 4 wherein the metal block is copper.

6. An electrode extension connector as claimed in claim 1 or 2 or 3 or 4 wherein the housing is a straight cylinder.

7. An electrode extension connector as claimed in claim 1 or 2 or 3 or 4 wherein the housing forms an angle from one end to the other.

8. An electrode extension connector as claimed in claim 7 wherein the angle is 90°.

9. An electrode extension connector as claimed in claim 7 wherein the angle is 45°.

* * * * *